Dec. 2, 1930.  W. J. MORSE  1,783,854
CLAMP LEVER FOR BUCKLES
Filed Dec. 28, 1929
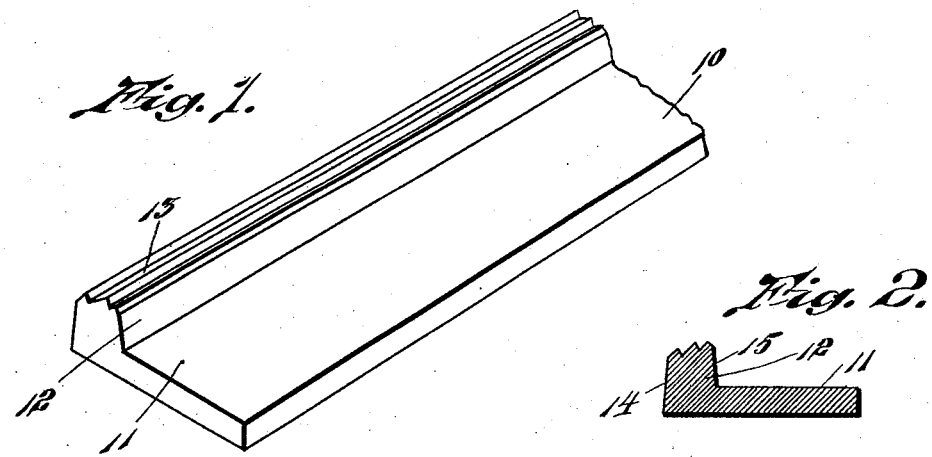
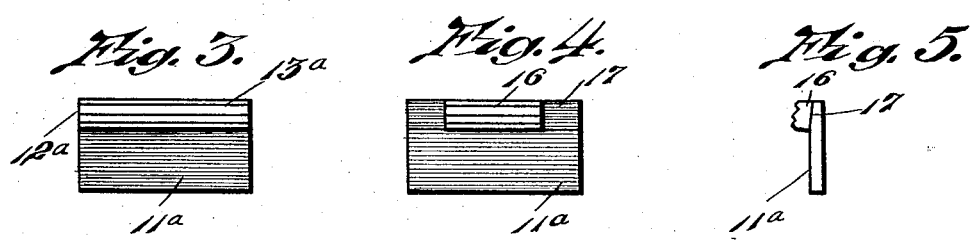
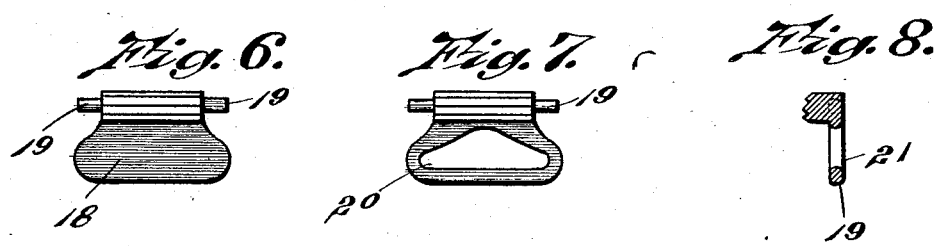
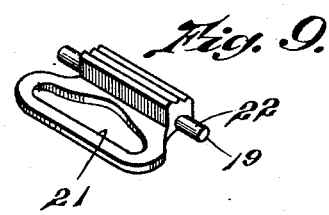
INVENTOR.
William J. Morse
BY Barlow & Barlow
ATTORNEYS.

Patented Dec. 2, 1930

1,783,854

UNITED STATES PATENT OFFICE

WILLIAM J. MORSE, OF ATTLEBORO, MASSACHUSETTS

CLAMP LEVER FOR BUCKLES

Application filed December 28, 1929. Serial No. 417,053.

My present invention relates to ornamental buckles and the like, and has particular reference to the formation of clamp levers therefor.

One object of the invention is to form a rigid, sturdy clamp lever from extruded metal.

Another object of the invention is to simplify the formation of clamp levers from bar stock.

A further object is to reduce the number of and to simplify the type of operations required for forming a clamp lever.

An additional object is to form clamp levers with a minimum of resulting waste material.

With these and other objects and advantageous features in view, the invention consists in the novel method and the novel construction more fully disclosed in the detailed description following and more particularly set forth in the appended claims.

Referring to the drawings:

Fig. 1 is a perspective view of an extruded bar stock suitable for forming clamp levers;

Fig. 2 is a cross section thereof:

Fig. 3 is a plan view of a clamp lever blank cut from the length of bar stock;

Fig. 4 is a view similar to Figure 3, showing the ends of the flange portion after shearing;

Fig. 5 is an end view of Figure 4;

Fig. 6 is a view similar to Figure 4, but showing the appearance of the blank after stamping;

Fig. 7 is a view similar to Figure 6, but showing the appearance of the blank after punching;

Fig. 8 is a cross section of Figure 7; and

Fig. 9 is a perspective view of the completed clamp lever.

It has been found desirable in the manufacture of clamp levers for belt buckles to utilize bar stock, thus providing a rigid, sturdy buckle, and eliminating the necessity of folding sheet stock, thus materially reducing manufacturing cost by substituting inexpense for costly operations, and by reducing the amount of scrap produced. I have devised a novel clamp lever which is formed from a novel metal blank extruded in the form of an L, the necessary operations to produce the finished article comprising cutting, shearing, punching, and finishing; and the following is a detailed description of a preferred form of clamp lever and of the novel method of producing the same.

Referring to the drawings, the novel blank 10 of hard material such as brass or the like is extruded in the form of an L, with a base section 11 and an upstanding flange section 12 substantially perpendicular to the base section, the flange section being formed with ribs functioning as gripping teeth 13 longitudinally positioned at the upper end thereof, and having sloping sides 14 and 15, as shown in Figure 2.

The extruded blank 10 is cut into suitable lengths, as shown in Figure 3, each having a base portion 11a, an upstanding flange portion 12a, and gripping teeth 13a. The lever blanks are then sheared or burred, as indicated in Figure 4, to remove the end portions of the flange 12a, leaving a central gripping portion 16 and two areas 17 which preferably extend below the surface of the base portion at each end thereof, as indicated in Figures 4 and 5.

The blank is then trimmed, preferably by a shearing or stamping operation, as shown in Figure 6, to provide a loop section 18 and trunnions 19; a punching operation now removes the center portion of the loop section 18 to form the loop 20, the final finishing operation, preferably by swaging, rounding the edges of the loop and the trunnions, as indicated at 21 and 22 in Figure 9.

My improved construction and method of producing the clamp lever therefore simplifies the formation of the completed lever, utilizes inexpensive cutting, shearing, and punching operations, and minimizes scrap.

While I have described a specific method of operation and a specific construction of a clamp lever, it is obvious that desired changes in procedure, in arrangement, or in form may be made without departing from the spirit and the scope of the invention as expressed in the appended claims.

I claim:

1. The method of forming clamp levers from L-shaped bar stock having a base and a flange substantially perpendicular thereto, comprising the steps of cutting the bar stock in suitable lengths each having a base portion and a flange portion, shearing the ends of the flange portion to form trunnion sections, shearing the base portion and the trunnion sections to provide a loop section and end trunnions, and punching the loop section to form a loop.

2. The method of forming clamp levers from L-shaped bar stock having a base and a flange substantially perpendicular thereto, comprising the steps of cutting the bar stock in suitable lengths, each having a base portion and a flange portion, shearing the ends of the flange portion to form trunnion sections, shearing the base portion and the trunnion sections to provide a loop section and end trunnions, punching the loop section to form a loop, and rounding the edges of the loop and the end trunnions.

3. The method of forming clamp levers from bar stock having a base and a flange substantially perpendicular thereto, comprising the steps of cutting the bar stock in suitable lengths, each having a base portion and a flange portion shearing the ends of the flange portion below the surface of the base portion to form trunnion sections, shearing the base portion and the trunnion sections to provide a loop section and end trunnions, and punching the loop section to form a loop.

4. The method of forming clamp levers from bar stock having a base and a flange substantially perpendicular thereto, comprising the steps of cutting the bar stock in suitable lengths, each having a base portion and a flange portion, shearing the ends of the flange portion below the surface of the base portion to form trunnion sections, shearing the base portion and the trunnion sections to provide a loop section and end trunnions, punching the loop section to form a loop, and rounding the edges of the loop and the end trunnions.

5. The method of forming clamp levers from bar stock comprising the steps of extruding metal bar stock in L shape with a base and a flange substantially perpendicular thereto, and ribs on the edge of said flange, cutting the bar stock in suitable lengths, each having a base portion and a flange portion, shearing the ends of the flange portion to form trunnion sections, shearing the base portion and the trunnion sections to provide a loop section and end trunnions, punching the loop section to form a loop, and rounding the edges of the loop and the end trunnions.

6. The method of forming clamp levers from bar stock having a base and a flange substantially perpendicular thereto, and ribs on the edge of said flange comprising the steps of cutting the bar stock in suitable lengths, each having a base portion and a flange portion, shearing the ends of the flange portion to form trunnion sections, shearing the base portion and the trunnion sections to provide a loop section and end trunnions, and punching the loop section to form a loop.

7. The method of forming clamp levers from bar stock having a base and a flange substantially perpendicular thereto, and ribs on the edge of said flange comprising the steps of cutting the bar stock in suitable lengths, each having a base portion and a flange portion, shearing the ends of the flange portion to form trunnion sections, shearing the base portion and the trunnion ends to provide a loop section and end trunnions, punching the loop section to form a loop, and rounding the edges of the loop and the end trunnions.

In testimony whereof I affix my signature.

WILLIAM J. MORSE.